Nov. 19, 1940.   J. L. BARR   2,222,359
PARKING DEVICE FOR AUTOMOBILES
Original Filed Aug. 20, 1932   3 Sheets-Sheet 3
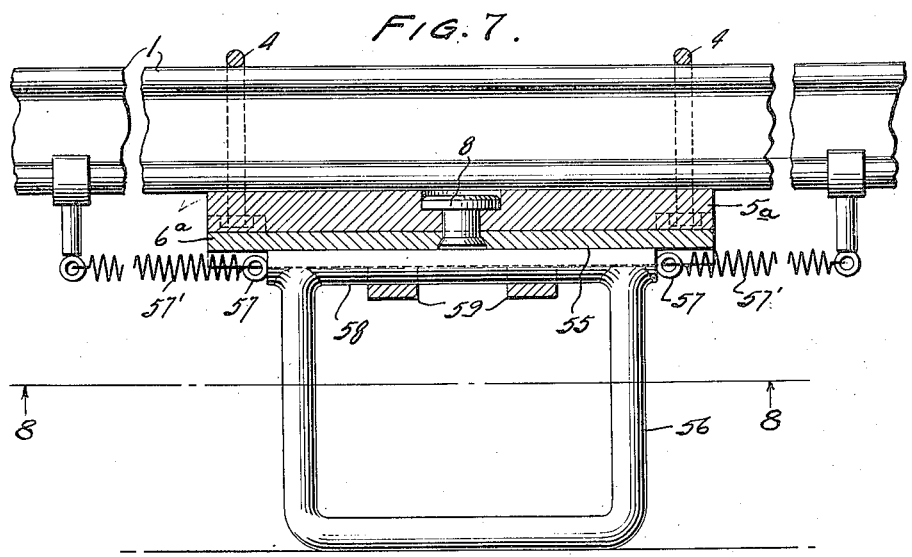
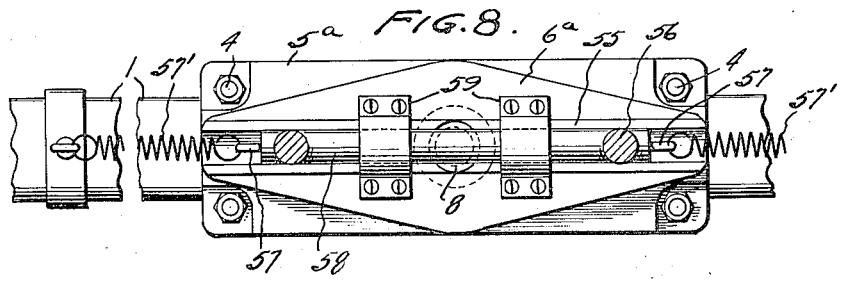
Inventor
JOHN L. BARR
By Semmes, Keegin & Semmes
Attorneys Patented Nov. 19, 1940

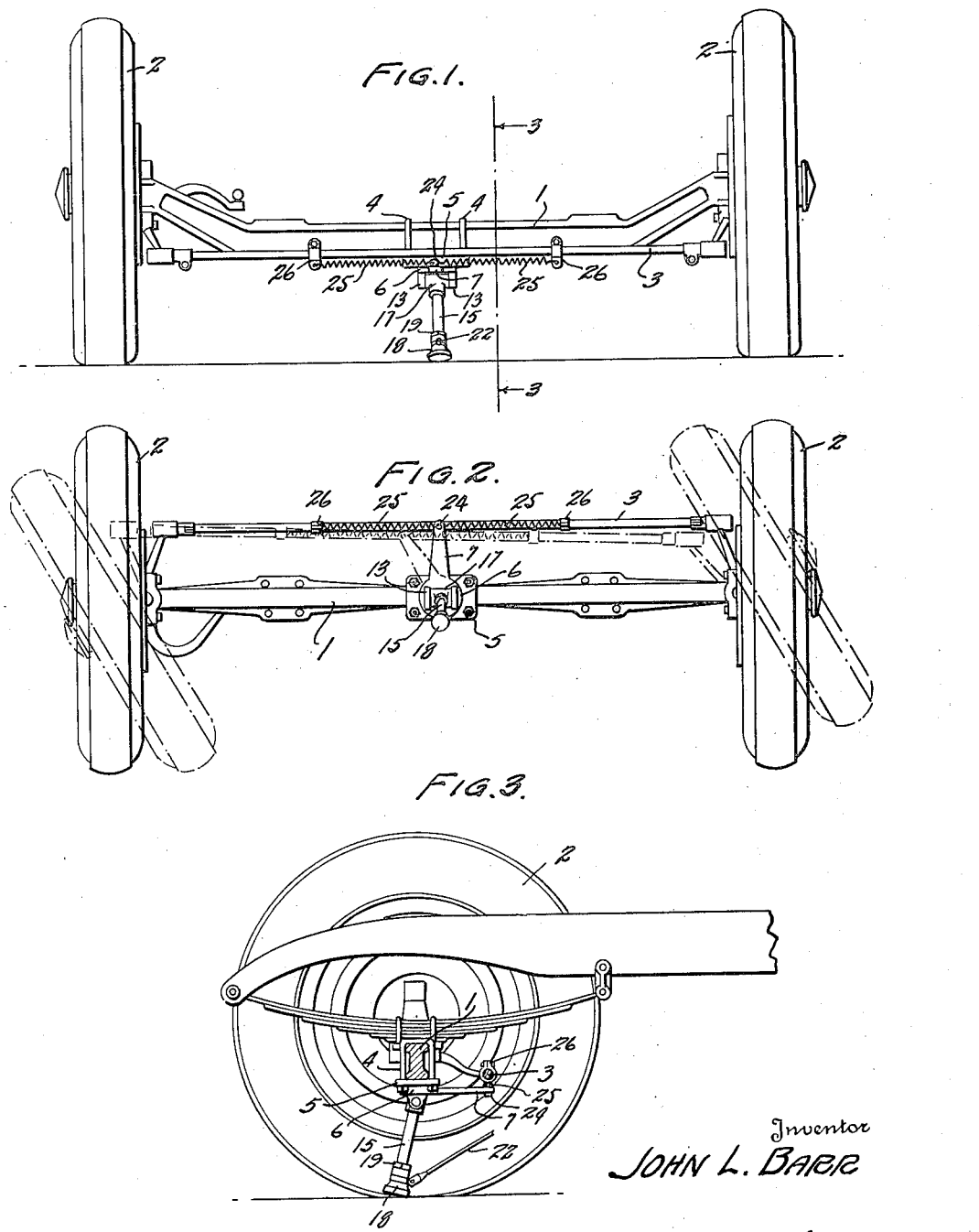

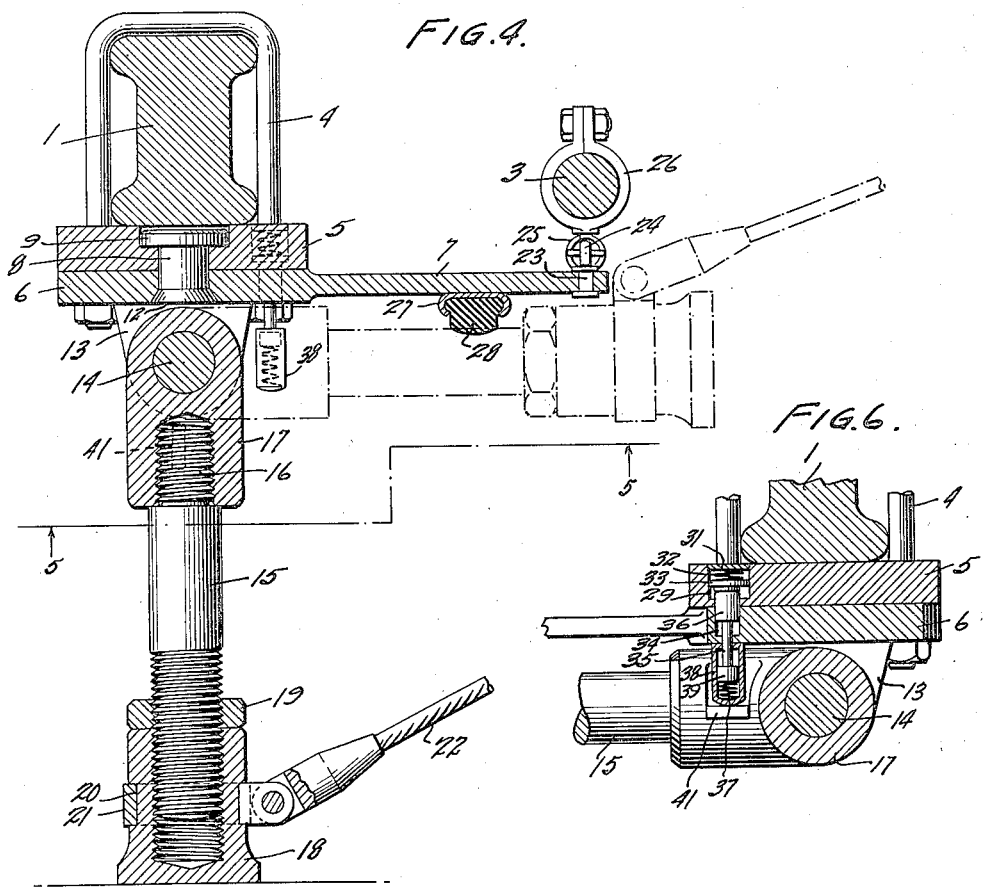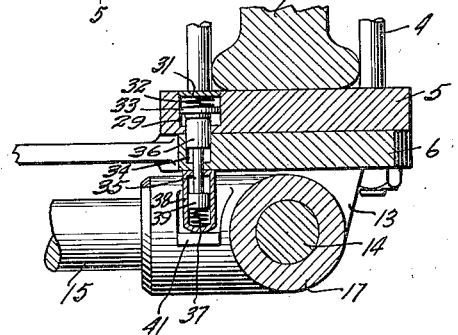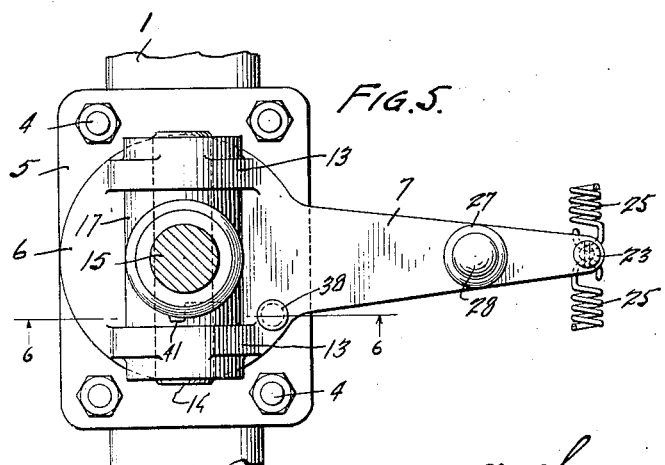

2,222,359

UNITED STATES PATENT OFFICE 2,222,359

PARKING DEVICE FOR AUTOMOBILES

John L. Barr, Chevy Chase, Md.

Application April 14, 1936, Serial No. 74,385, which is a division of application Serial No. 629,691, August 20, 1932. Divided and this application February 10, 1938, Serial No. 189,862

5 Claims. (Cl. 180—1)

This application is a division of my co-pending application, Serial No. 74,385, filed April 14, 1936, now Patent No. 2,151,828, which case is a division of application Serial No. 629,691, filed August 20, 1932, now Patent No. 2,086,459 patented July 6, 1937.

An object of this invention is to minimize the danger of injury both to the elevating device and to the roadbed through twisting strains which may be imposed upon the device due to inequalities in the roadbed, cramp of the steering wheels and other like factors.

Another object of my invention is to provide a simple construction that is easily and cheaply made and will always be available for instant operation when it is necessary to turn the car on a short radius.

A still further object of my invention is to provide a device which will permit turning of the car on a short radius with a minimum of effort, and yet which has no harmful effect on the normal steering of the vehicle when the device itself is not in operation.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

Figure 1 is an elevation, looking from the rear of the car towards the front, of the front steering wheels of the car with my elevating device attached in place.

Figure 2 is a bottom plan view of the construction shown in Figure 1, with part of the details omitted.

Figure 3 is a view taken on the line 3—3 of Figure 1, looking in the direction of the arrows.

Figure 4 is a view partly in cross section of the details of construction of my elevating device, showing in dotted lines the device raised to the inoperative position.

Figure 5 is a view taken on the line 5—5 of Figure 4, looking in the direction of the arrows.

Figure 6 is a view taken on the line 6—6 of Figure 5, looking in the direction of the arrows.

Figure 7 is a front elevation partly in section of another modification of my device.

Figure 8 is a view taken along the line 8—8 of Figure 7, looking in the direction of the arrows.

Referring to the drawings, and particularly to the form of my device shown in Figures 1 to 6 inclusive, I have shown a steering axle of an automobile, which is normally the front axle, designated by the numeral 1. Mounted on this front axle are steering wheels 2, shown in a cramped position in dotted lines in Figure 2. In order to steer the wheels, proper connections such as are usual in constructions of this character are made, which include a steering tie rod 3.

Fastened by suitable U-clamps 4 to the under side of the front axle is an elevating mechanism comprising a support plate 5, which acts as one-half of a swivel joint, the other half of which is a swivel plate 6 having an arm 7 integrally formed therewith. The support plate 5 and the swivel plate 6, which is in sliding contact therewith, are mounted so that the plate 6 can swivel on the plate 5.

There is a stud 8, as plainly shown in Figure 4, whose upper end is provided with a head 9 which fits in the recess 11 of the support plate 5. The lower end of the stud 8 may be provided with a flanged portion 12 which is suitably attached by any known means to the stud 8, and which permits the swivel plate 6 to rotate on the support plate 5. The swivel plate 6 is provided with two downwardly extending trunnion blocks 13 which hold the ends of a stub axle 14.

Mounted to swing on the stub axle 14 is an elevating rod 15 which is screwed, at 16, into a bearing member 17 which swivels on the stub axle 14. At the lower end of the elevating rod 15 I have provided a foot construction comprising a foot member 18 into which is screwed the rod 15. A lock nut 19 is then screwed into position to hold the rod 15 in the foot member 18 at the desired position. This construction permits the rod 15 to have any desired operative length to accommodate for various sizes of cars.

The foot member 18 is made with an annular recess 20 around which is bolted a collar 21 to which is attached, by suitable connections, a cable 22 so that upon pulling the cable the elevating rod 15 and the accompanying mechanism may be drawn up into the position shown in dotted lines in Figure 4.

The rod 15 may be, in operation, let down, and may swing on either side of the vertical. The driver, for instance in the position shown in Figure 3, drives the car forward to raise the front end sufficiently to relieve the weight on the front wheels to permit them to be readily turned. If the elevating rod 15, however, was on the other side of the vertical, he would back the car on to the rod so that the wheels could be readily turned. This general form of operation is shown in my Patents Nos. 1,967,219; 1,954,308; 1,969,198; 1,963,879; and Re. 19,247. It gives a flexibility of operation not inherent in the other devices. There is no danger of injuring the elevating rod because there is no stop against which the momentum of the car can deal a damaging impact.

The device is merely allowed to fall into engagement with the roadbed, and if the driver fails to mount upon the device at the exact position he wants, and should drive over it, for instance by backing the car, he can come forward a few inches and mount it again. It will be understood that the control is applied through the power of the car and through the control of the foot brakes. It is an easy operation to drive up on the device and hold the car by means of the brakes in the desired position while the front wheels are turned. All this has been explained in my applications which issued into the patents listed above.

In the construction shown in the drawings, the arm 7 is provided near its end with a support piece 23 carrying an upstanding eyelet member 24 to which are attached springs 25, the springs 25 at their other ends being attached to support pieces 26 mounted on the steering tie rod 3.

The arrangement is such that through the arm 7 and the spring connections with the tie rod, the elevating rod 15 is swiveled on the swivel joint comprising the support plate 5 and swivel plate 6, so that when the rod 15 swings either forward or to the rear of the vertical on the stub axle 14, the plane of swing of the member 15 will be substantially in line with a plane passing through the wheels. This is plainly shown in Figure 2, which shows the wheels cramped and the rod 7 in dotted lines having been carried to one side. The plane of swing of the rod 15 will be substantially parallel to the cramped position of the wheels.

In order to permit the device to be held in its upper inoperative position, as shown in Figure 4, without danger of rattling or of injuring the device, or the car structure, I have shown on the bottom of the arm 7 a holding clamp 27 on which is mounted a rubber bumper 28 against which the rod 15 rests when the cable 22 has hauled it into its uppermost position.

In order to hold the mechanism in its inoperative position from swinging each time the steering wheels are moved, I have shown the support plate 5 provided with a recess 29 having a suitable cap 31 screwed therein. In the recess is mounted a spring 32 carrying a spring pressed plate 33. There is provided in the swivel plate 6 a recess 34 in which is mounted a plunger 35 having a head 36 which, in the position of the parts shown in Figure 6, passes through the apertures in the swivel plate 6 and support plate 5, locking the two so that the swivel plate 6 cannot rotate or swivel on the support plate 5. Urging the plunger 35 into its upper position is a spring 37 mounted in a support piece 38. The plunger 35 is provided at its lower end with a head 39 against which the spring 37 bears.

In the position shown in Figure 6, the head 36 of the plunger 35 locks the swivel plate 6 from rotation, and the plunger 35 is held in spring pressed relation between the tension springs 32 and 37. Upon lowering the elevating rod 15 by releasing the cable 22, a contact lug 41, which has been bearing against the head 39, falls with the rod 15 and no longer pushes against the head 39. The head 39 then falls and the spring 32 pushes the head 36 of the plunger 35 to the lower position, so that the head 36 no longer locks the swivel plate 6 from rotation.

Now, let us assume that the rod 15 has again been raised into the position shown in Figure 6, but that the cramp of the wheels prevents the head 36 from entering in the aperture in the plate 5. In such a case no harm is done, because the spring 37 is merely compressed and the head 36 will enter the aperture in the plate 5 when the rod 7 is in a position such as is shown in Figure 2 in the full line position.

This construction permits the device to be held in position to prevent its constant swiveling when not in use, and yet it is free to swivel immediately upon lowering the elevating rod 15. By reason of the fact that the connection between the rod 7 and the tie rod 3 is through springs 25, the normal steering of the vehicle when the parts are in the position shown in Figure 6 can proceed without undue interference. The spring connection between the rod 7 and the rod 3 is also of advantage in view of changes in the angular position of the rod 3 during cramping of the wheels—for instance, such an advantage as is depicted in dotted lines in Figure 2.

In Figures 7 and 8 I have shown a form of device in which the base plate 5a and swivel plate 6a are of considerably greater length, for instance, than in the forms shown in Figures 1 to 6 inclusive. The swivel plate is not provided with any arm, but is provided with a downwardly projecting trough 55 in which is adapted to slide the top of a rectangular elevating leg construction 56. Eyelet members 57 are positioned at either end of the top of the elevating leg construction 56, and spring members 57' tend to center this construction in the position shown in Figure 11. Passing around the top bar of the elevating construction 56, which I have designated by the numeral 58, are straps 59, which permit the bar to rotate, and at the same time to slide in the trough construction 55.

In the construction shown in Figures 7 and 8, the elevating construction is free to swivel about the member 8. The member 56 can be raised and lowered, pivoting on the straps 59, and a sliding motion is possible in the trough 55. Thus freedom of motion in a plurality of directions is possible to prevent strain on the elevating device and its cooperating structure, as well as on the roadbed.

The construction just described permits movement between the parts to take care of strains imposed for instance when the wheels are cramped while the car is being driven up on to or down from the compression element, and twisting and sideways motions are imparted to the supporting structure.

I claim:

1. A device to relieve at least part of the weight on the steering wheels of a vehicle comprising an elevating member, a pivot therefor between the elevating member and the vehicle to take care of twisting movement, another pivot between the first mentioned pivot and the elevating member at substantially right angles thereto, and means permitting sliding of the elevating member transversely to compensate for lateral movement.

2. A device to relieve at least part of the weight on the steering wheels of a vehicle comprising an elevating member, a pivot therefor between the elevating member and the vehicle to take care of twisting movement, another pivot between the first mentioned pivot and the elevating member at substantially right angles thereto, spring means tending to center the elevating member laterally, and means permitting sliding of the elevating member transversely to compensate for lateral movement.

3. A device to relieve at least part of the weight on the steering wheels of a vehicle comprising a rectangular elevating member upon which the vehicle is adapted to be driven by either forward or backward movement of the vehicle, a pivot therefor between the elevating member and the vehicle to take care of twisting forces, another pivot between the first mentioned pivot and the elevating member at substantially right angles thereto, means permitting sliding of the elevating member transversely to compensate for lateral movement, and spring means associated with the elevating member and the axle tending to center the elevating member laterally of the vehicle.

4. In a device adapted to be associated with the axle of a motor vehicle for relieving at least part of the weight on the steering wheels, a rectangular elevating member supported by the axle and adapted to slide transversely to compensate for lateral movement, a pivot for said elevating member located between the elevating member and the axle, and spring means attached at one end to the axle and at the other end to the elevating member to center the elevating member laterally.

5. In a device adapted to be associated with the axle of a motor vehicle for relieving at least part of the weight on the steering wheels, a base attached to the axle, a plate pivotally connected to the base, a rectangular elevating arm pivotally secured to said plate at substantially right angles to said first mentioned pivot, said elevating member being mounted for sideways movement in said plate to compensate for lateral movement, and spring means to center said elevating member laterally of the vehicle.

JOHN L. BARR.